United States Patent
Alber

(10) Patent No.: US 9,567,105 B2
(45) Date of Patent: Feb. 14, 2017

(54) AIRCRAFT WITH INTEGRATED SINGLE SENSOR

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 72 days.

(21) Appl. No.: 14/722,921

(22) Filed: May 27, 2015

(65) Prior Publication Data

US 2015/0344135 A1    Dec. 3, 2015

Related U.S. Application Data

(60) Provisional application No. 62/006,533, filed on Jun. 2, 2014.

(51) Int. Cl.
  *B64D 47/08*   (2006.01)
  *B64C 29/02*   (2006.01)

(52) U.S. Cl.
  CPC ........... *B64D 47/08* (2013.01); *B64C 29/02* (2013.01); *B64C 2201/021* (2013.01); *B64C 2201/088* (2013.01); *B64C 2201/127* (2013.01)

(58) Field of Classification Search
  CPC ............ B64D 47/08; B64C 2201/127; B64C 2201/088
  USPC ........................................................ 244/124
  See application file for complete search history.

(56) References Cited

U.S. PATENT DOCUMENTS

| | | | | |
|---|---|---|---|---|
| 4,114,839 A | * | 9/1978 | Sibley | B64D 47/08 244/118.1 |
| 4,746,082 A | * | 5/1988 | Syms | B64D 47/08 244/118.2 |
| 5,426,476 A | * | 6/1995 | Fussell | B64D 47/08 348/E5.026 |
| 5,575,438 A | | 11/1996 | McGonigle | |
| 5,927,648 A | * | 7/1999 | Woodland | B64C 1/1415 244/118.1 |
| 6,264,135 B1 | * | 7/2001 | Dacosta | B64D 47/08 244/1 R |
| 6,405,975 B1 | * | 6/2002 | Sankrithi | |
| 6,616,097 B2 | * | 9/2003 | Hilbert | B64C 1/20 244/118.1 |
| 6,847,865 B2 | * | 1/2005 | Carroll | B64C 39/024 244/190 |
| 7,106,217 B2 | | 9/2006 | Judge | |
| 7,149,611 B2 | | 12/2006 | Beck | |
| 7,210,654 B1 | * | 5/2007 | Cox | B64C 39/024 244/190 |

(Continued)

FOREIGN PATENT DOCUMENTS

EP    1704089    9/2012

*Primary Examiner* — Timothy D Collins
*Assistant Examiner* — Keith L Dixon
(74) *Attorney, Agent, or Firm* — Cantor Colburn LLP

(57) ABSTRACT

An aircraft is provided and includes a single sensor and wings extending outwardly in opposite directions from a fuselage. Each wing includes a main section, an engine section supported on the main section and tail surfaces extending transversely relative to the main section. The single sensor is mountable to one of the tail surfaces with a field of view (FOV) representable as a spherical wedge having a dihedral angle exceeding 180°.

13 Claims, 2 Drawing Sheets

(56) References Cited

U.S. PATENT DOCUMENTS

| | | | | |
|---|---|---|---|---|
| 7,610,841 B2 * | 11/2009 | Padan | B64D 1/04 244/118.1 |
| 7,925,391 B2 * | 4/2011 | Sanders-Reed | G06F 3/14 345/8 |
| 8,079,548 B2 | 12/2011 | Luce | |
| 8,548,314 B2 * | 10/2013 | Zwaan | B64C 39/024 396/12 |
| 8,657,230 B2 * | 2/2014 | Woodland | B64C 1/1461 244/118.1 |
| 8,882,046 B2 * | 11/2014 | Edsall | B64D 47/00 244/137.4 |
| 9,031,311 B2 * | 5/2015 | Tillotson | B64D 45/0005 382/141 |
| 2005/0029399 A1 * | 2/2005 | Lowe | G03B 15/006 244/118.1 |
| 2011/0001020 A1 | 1/2011 | Forgac | |

* cited by examiner

AIRCRAFT WITH INTEGRATED SINGLE SENSOR

CROSS REFERENCE TO RELATED APPLICATION

This application is a Non-Provisional of U.S. Application No. 62/006,533 filed Jun. 2, 2014, the disclosures of which are incorporated by reference herein in its entirety.

BACKGROUND OF THE INVENTION

The subject matter disclosed herein relates to an aircraft with an integrated single sensor and, more particularly, to a vertical take-off and landing (VTOL) aircraft with an integrated single sensor.

A vertical take-off and landing aircraft (VTOL) is an aircraft that can take off, land and hover in a vertical direction and that can conduct flight operations in a horizontal orientation. VTOL aircraft may be manned (i.e., piloted) or unmanned in the case of remotely piloted or autonomous aircraft and may be housed or stowed in places with limited deck and storage areas, such as naval ships.

Current VTOL aircraft may be provided with a rotor blown wing (RBW) configuration, which offers a unique blend of rotorcraft and fixed wing features and attributes. For example, VTOL aircraft with RBW configurations tend to more compact than similar aircraft with other configuration types. This compactness leads to certain challenges, however, such as those related to providing adequate sensor fields of view (FOV) and the need for the VTOL aircraft to be capable of flying vertically and horizontally. In particular, a conventional sensor mounting for these aircraft is normally located on the fuselage and thus has a limited FOV due to nacelles, vertical tails and propeller-rotors. Other sensor mountings have been proposed, such as ones with two mountings and added complexity.

BRIEF DESCRIPTION OF THE INVENTION

According to one aspect of the invention, an aircraft is provided and includes a single sensor and wings extending outwardly in opposite directions from a fuselage. Each wing includes a main section, an engine section supported on the main section and tail surfaces extending transversely relative to the main section. The single sensor is mountable to one of the tail surfaces with a field of view (FOV) representable as a spherical wedge having a dihedral angle exceeding 180°.

In accordance with additional or alternative embodiments, the aircraft is configured to perform unmanned vertical and horizontal flight, the FOV being horizontally and vertically directable during the vertical and horizontal flight, respectively.

In accordance with additional or alternative embodiments, the aircraft further includes alighting elements disposed on the tail surfaces.

In accordance with additional or alternative embodiments, the single sensor includes a pylon coupled to a distal end of the one of the tail surfaces and disposed to extend toward the outer diameter of the rotor disk, an aerodynamic fairing disposed along the pylon and a sensor element coupled to a distal end of the pylon.

In accordance with additional or alternative embodiments, the FOV is bound by the rotor disk, a surface of the fairing and the other rotor disk.

In accordance with additional or alternative embodiments, the aircraft further includes a flight computer to which the single sensor is operably coupled via one of the tail surfaces and the main section.

According to another aspect of the invention, an aircraft is provided and includes a fuselage, wings and a single sensor. The wings extend outwardly in opposite directions from the fuselage. Each wing includes a main section, a rotor defining a rotor disk, an engine nacelle supported on the main section and configured to drive rotor rotation and tail surfaces extending transversely relative to the main section. The single sensor is mounted to one of the tail surfaces for disposition in substantial alignment with an outer diameter of the rotor disk.

In accordance with additional or alternative embodiments, the aircraft is configured to perform unmanned vertical and horizontal flight.

In accordance with additional or alternative embodiments, a field of view (FOV) of the single sensor is horizontally directable during the vertical flight and downwardly directable during the horizontal flight.

In accordance with additional or alternative embodiments, the aircraft further includes alighting elements disposed on the tail surfaces.

In accordance with additional or alternative embodiments, the tail surfaces extend perpendicularly relative to the main section.

In accordance with additional or alternative embodiments, the single sensor has a field of view (FOV) representable as a spherical wedge with a dihedral angle exceeding 180°.

In accordance with additional or alternative embodiments, the single sensor includes a pylon coupled to a distal end of one of the tail surfaces and disposed to extend toward the outer diameter of the rotor disk, an aerodynamic fairing disposed along the pylon and a sensor element coupled to a distal end of the pylon.

In accordance with additional or alternative embodiments, a field of view (FOV) of the single sensor is bound by the rotor disk, a surface of the fairing and the other rotor disk.

In accordance with additional or alternative embodiments, the aircraft further includes a flight computer to which the single sensor is operably coupled via one of the tail surfaces and the main section.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

The detailed description explains embodiments of the invention, together with advantages and features, by way of example with reference to the drawings.

As described below, a vertical take-off and landing (VTOL) aircraft is provided and includes a single sensor mounted to one vertical tail. This single sensor thus offers a field of view (FOV) that is adequate for forward flight in fixed wing mode and in VTOL (i.e., nose up) mode for take-offs and landings and hover operations. The sensor is located laterally to one side of the aircraft, which is expected to be favored for the take-offs and landings.

Figure 1:
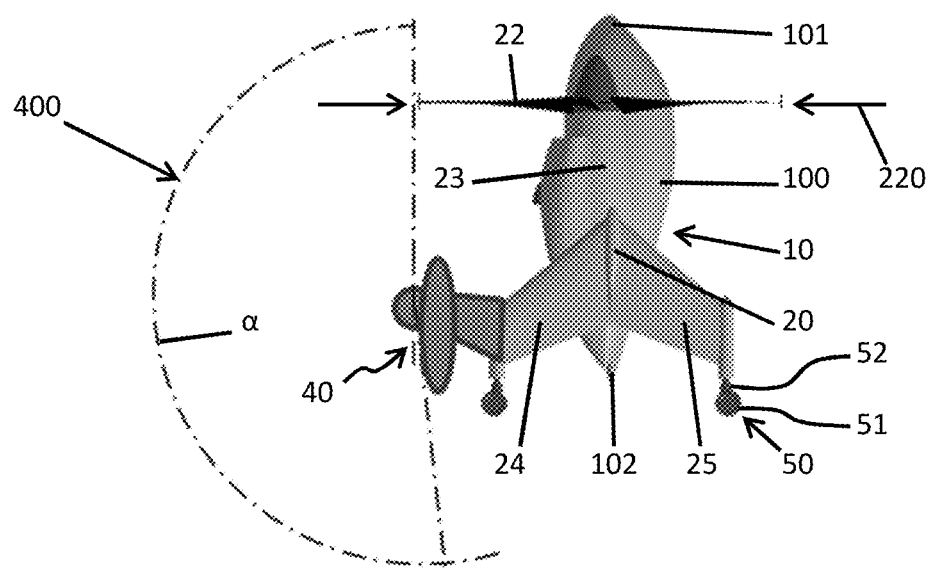
FIG. 1 is a side view of a vertical take-off and landing (VTOL) aircraft during take-off, landing and hover modes in accordance with embodiments.
Figure 2:
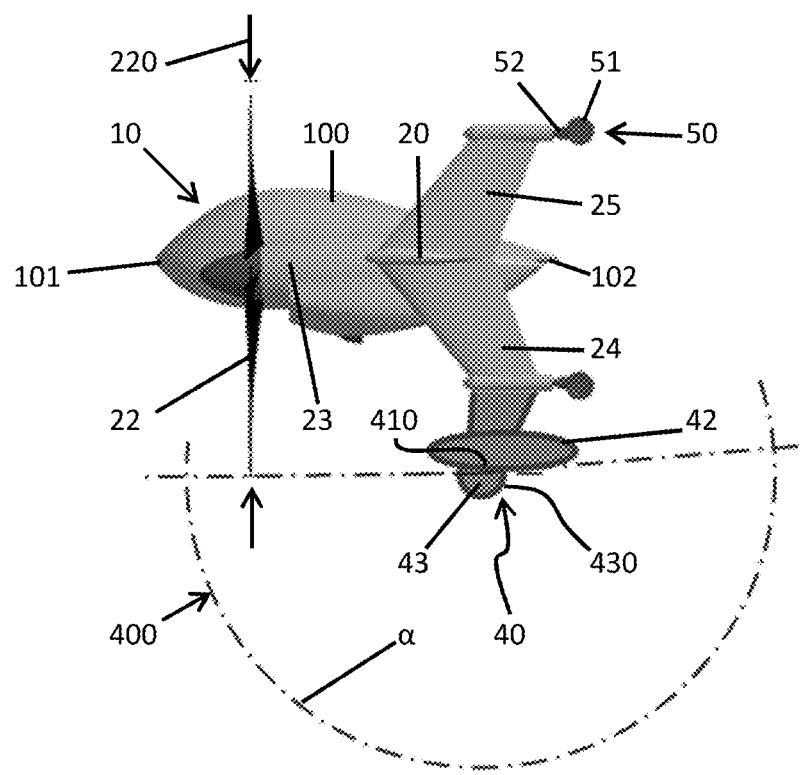
FIG. 2 is a side view of the VTOL aircraft of FIG. 1 during a substantially horizontal flight mode.
Figure 3:
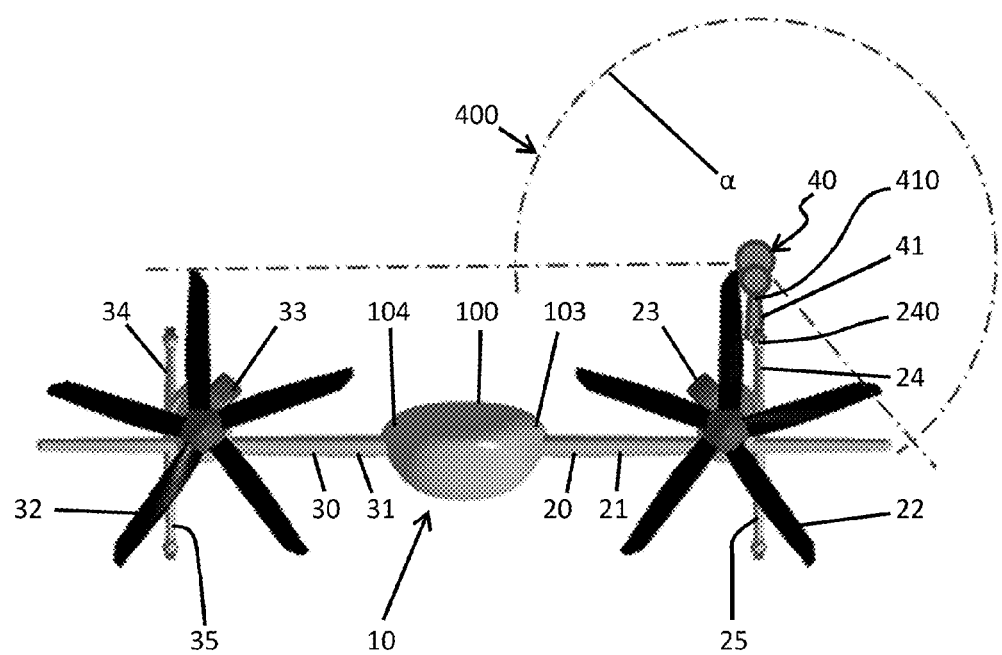
FIG. 3 is a front view of the VTOL aircraft of FIG. 1.

With reference to FIGS. 1-3, a VTOL aircraft 10 includes a fuselage 100 extending along a longitudinal axis that has a nose cone section 101 at a first longitudinal end of the fuselage 100, a tail section 102 opposite from the nose cone section 101 at a second longitudinal end of the fuselage 100, a first side 103 extending along the fuselage 100 and a second side 104 opposite the first side 103 and extending along the fuselage 100. The fuselage 100 is generally formed to have reduced or otherwise limited aerodynamic drag for flight operations and defines an interior in which multiple components are housed for such flight operations.

As illustrated, the fuselage 100 is configured to support unmanned flight operations but it is to be understood that this is not required and that the VTOL aircraft 10 could be manned, unmanned, auto-piloted or remote-piloted. In any case, the VTOL aircraft 10 is configured for performing substantially vertical flight operations (i.e., during take-off, landing and hover maneuvers) and for performing substantially horizontal flight operations (i.e., during mission execution).

The VTOL aircraft 10 further includes a first wing 20 extending radially outwardly from the first side 103 of the fuselage 100, a second wing 30 extending radially outwardly from the second side 104 of the fuselage 100 and a single sensor 40. The first and second wings 20 and 30 may extend in substantially opposite directions and may be substantially parallel and coplanar with each other.

The first wing 20 includes a main section 21, which has an aerodynamic shape, a rotor 22 that is rotatable and formed to define a rotor disk 220 when rotating, an engine nacelle 23 and first and second tail surface 24 and 25 (the rotor 22 and the engine nacelle 23 may be referred to collectively as an engine section). The engine nacelle 23 is supported on the main section 21 and configured to drive rotation of the rotor 22 to thereby drive flight operations of the VTOL aircraft 10. The first tail surface 24 extends transversely in a first direction relative to the main section 21 and the second tail surface 25 extends transversely in a second direction, which may be opposite the first direction, relative to the main section 21.

In accordance with embodiments, the first and second tail surfaces 24 and 25 may be oriented perpendicularly with respect to the main section 21. In accordance with further embodiments, the first direction may be defined such that the first tail surface 24 extends toward the ground during horizontal flight of the VTOL aircraft 10.

The second wing 30 includes a main section 31, which has an aerodynamic shape, a rotor 32 that is rotatable and formed to define a rotor disk (similar in definition to rotor disk 220 but not specifically shown) when rotating, an engine nacelle 33 and third and fourth tail surfaces 34 and 35 (the rotor 32 and the engine nacelle 33 may be referred to collectively as an engine section). The engine nacelle 33 is supported on the main section 31 and configured to drive rotation of the rotor 32 to thereby drive flight operations of the VTOL aircraft 10. The third tail surface 34 extends transversely in a first direction relative to the main section 31 and the fourth tail surface 35 extends transversely in a second direction, which may be opposite the first direction, relative to the main section 31.

In accordance with embodiments, the third and fourth tail surfaces 34 and 35 may be oriented perpendicularly with respect to the main section 31. In accordance with further embodiments, the first direction may again be defined such that the third tail surface 34 extends toward the ground during horizontal flight of the VTOL aircraft 10.

During grounded conditions where the VTOL aircraft 10 is not in engaged in flight operations and following landings of the VTOL aircraft 10, the VTOL aircraft 10 is supported in an alighted position by alighting elements 50. The alighting elements 50 may include base elements 51 and gearing 52 by which the base elements 51 are coupled to tail ends of each of the first-fourth tail surfaces 24, 25, 34 and 35. The alighting elements 50 are configured such that the VTOL aircraft 10 can be stably supported by the alighting elements 50 on the ground with the nose cone section 101 of the fuselage 100 pointed upwardly from the ground and with the tail section 102 pointed at the ground.

The single sensor 40 is mounted to one of the tail surfaces (e.g., first tail surface 24) for disposition in substantial alignment with an outer diameter of the rotor disk 220 of the rotor 22. As such, the single sensor 40 has a field of view (FOV) 400 that is representable as a spherical wedge having a dihedral angle $\alpha$ that exceeds 180°. As shown in FIG. 1, due to the single sensor 40 being mounted on the first tail surface 24, this FOV 400 is horizontally directable during the substantially vertical flight operations of the aircraft 10 and is downwardly directable during the substantially horizontal flight operations of the aircraft 10.

Thus, during the substantially vertical flight operations, such as take-offs and landings, the single sensor 40 will be capable of sensing regions along, for example, a landing pad. Conversely, during the substantially horizontal flight operations, the single sensor 40 will be capable of sensing the ground below the VTOL aircraft 10. In contrast, if the single sensor 40 were mounted on the second tail surface 25, the single sensor 40 would be capable of sensing regions of the landing pad "behind" the VTOL aircraft during the substantially vertical flight operations and the air space above the VTOL aircraft 10 during the substantially horizontal flight operations.

As shown in FIGS. 2 and 3, in particular, the single sensor 40 includes a pylon, 41, an aerodynamic fairing 42 and a sensor element 43. The pylon 41 is coupled to a distal end 240 of the first tail surface 24 and is disposed to extend span-wise toward the outer diameter of the rotor disk 220 of the rotor 22 (see FIGS. 1 and 2). The aerodynamic fairing 42 is disposed along a span of the pylon 41 and is provided with an aerodynamic, low drag outer hull that reduces drag and wind resistance of the single sensor 40 as a whole. The sensor element 43 is coupled to a distal end 410 of the pylon 41. The sensor element 43 can be any type of sensor, such as an infrared (IR) sensor, another similar type of sensor or a combination thereof.

In accordance with embodiments, the sensor element 43 may include a generally rounded or semi-spherical radome structure 430 that protrudes away from the distal end 410 of the pylon 41 to provide for structural and atmospheric protection for electrical components of the sensor element 43. In accordance with embodiments, the radome structure 430 may be moisture impermeable, capable of withstanding impacts by foreign objects and/or impedance matched to the electrical components of the sensor element 43.

With the structures and configurations described above, the electrical components of the sensor element 43 may be substantially centered within the radome structure 430. In this position, the FOV 400 of the single sensor 40 is bound by the rotor disk 220 of the rotor 22, a surface of the outer hull of the aerodynamic fairing 42 and the rotor disk of the rotor 32 (see FIG. 3).

Figure 4:
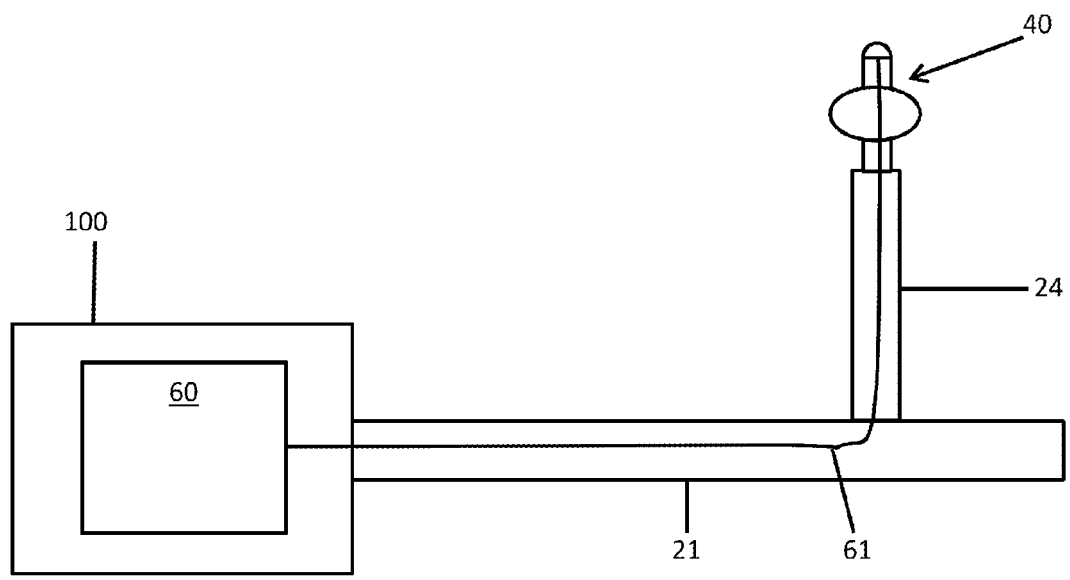
FIG. 4 is a schematic diagram illustrating a connection between a single sensor of an aircraft and a flight computer in accordance with embodiments.

With reference to FIG. 4, the VTOL aircraft 10 may further include a flight computer 60. The flight computer 60 may be housed substantially within the fuselage 100 and configured for controlling the various flight operations of the VTOL aircraft 10. Such control of the various flight operations may include, in particular, compensating for the asymmetrical configuration of the VTOL aircraft 10 given the mounting of the single sensor 40 on the first tail surface 24. In accordance with embodiments, the single sensor 40 may be disposed in signal communication with the flight computer 60 via wireless protocols or via wiring 61. Such wiring 61 may extend from the single sensor 40 to the flight computer 60 via the tail surface 24 and the main section 21. In any case, the flight computer 60 will be capable of determining whether flight plans need to be changed based on readings from the single sensor 40. Such readings may include, but are not limited to, the identification of obstacles or threats within the FOV 400.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
   a single sensor; and
   wings extending outwardly in opposite directions from a fuselage, each wing comprising a main section, an engine section supported on the main section and tail surfaces extending transversely relative to the main section, and
   the single sensor being mountable to one of the tail surfaces with a field of view (FOV) representable as a spherical wedge having a dihedral angle exceeding 180°;
   wherein the single sensor comprises:
   a pylon coupled to a distal end of the one of the tail surfaces and disposed to extend to the outer diameter of a rotor disk;
   an aerodynamic fairing disposed along the pylon; and
   a sensor element coupled to a distal end of the pylon.

2. The aircraft according to claim 1, wherein the aircraft is configured to perform unmanned vertical and horizontal flight, the FOV being horizontally and vertically directable during the vertical and horizontal flight, respectively.

3. The aircraft according to claim 1, further comprising alighting elements disposed on the tail surfaces.

4. The aircraft according to claim 1, wherein the FOV is bound by the rotor disk, a surface of the fairing and the other rotor disk.

5. The aircraft according to claim 1, further comprising a flight computer to which the single sensor is operably coupled via the tail surface and the main section.

6. An aircraft, comprising:
   a fuselage;
   wings extending outwardly in opposite directions from the fuselage, each wing comprising a main section, a rotor defining a rotor disk, an engine nacelle supported on the main section and configured to drive rotor rotation and tail surfaces extending transversely relative to the main section; and
   a single sensor mounted to one of the tail surfaces for disposition in substantial alignment with an outer diameter of the rotor disk;
   wherein the single sensor comprises:
   a pylon coupled to a distal end of one of the tail surfaces and disposed to extend to the outer diameter of a rotor disk;
   an aerodynamic fairing disposed along the pylon; and
   a sensor element coupled to a distal end of the pylon.

7. The aircraft according to claim 6, wherein the aircraft is configured to perform unmanned vertical and horizontal flight.

8. The aircraft according to claim 7, wherein a field of view (FOV) of the single sensor is horizontally directable during the vertical flight and downwardly directable during the horizontal flight.

9. The aircraft according to claim 6, further comprising alighting elements disposed on the tail surfaces.

10. The aircraft according to claim 6, wherein the tail surfaces extend perpendicularly relative to the main section.

11. The aircraft according to claim 6, wherein the single sensor has a field of view (FOV) representable as a spherical wedge with a dihedral angle exceeding 180°.

12. The aircraft according to claim 6, wherein a field of view (FOV) of the single sensor is bound by the rotor disk, a surface of the fairing and the other rotor disk.

13. The aircraft according to claim 6, further comprising a flight computer to which the single sensor is operably coupled via one of the tail surfaces and the main section.

* * * * *